United States Patent
Park et al.

(10) Patent No.: US 12,421,381 B2
(45) Date of Patent: Sep. 23, 2025

(54) THERMOPLASTIC RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Jung Tae Park, Daejeon (KR); Dae Woo Lee, Daejeon (KR); Jae Bum Seo, Daejeon (KR); Gyu Sun Kim, Daejeon (KR); Jiuk Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 852 days.

(21) Appl. No.: 17/419,494

(22) PCT Filed: Sep. 24, 2020

(86) PCT No.: PCT/KR2020/012972
§ 371 (c)(1),
(2) Date: Jun. 29, 2021

(87) PCT Pub. No.: WO2021/080199
PCT Pub. Date: Apr. 29, 2021

(65) Prior Publication Data
US 2022/0089854 A1  Mar. 24, 2022

(30) Foreign Application Priority Data
Oct. 23, 2019  (KR) .................. 10-2019-0132327

(51) Int. Cl.
*C08L 33/08* (2006.01)
(52) U.S. Cl.
CPC .................... *C08L 33/08* (2013.01)
(58) Field of Classification Search
CPC ...................................... C08L 33/08
See application file for complete search history.

(56) References Cited

U.S. PATENT DOCUMENTS

2018/0265690 A1*  9/2018  Kim .......................... C08J 5/00
2021/0040312 A1*  2/2021  Kakimoto ............... C08L 51/04

FOREIGN PATENT DOCUMENTS

| EP | 3168262 A1 | 5/2017 | |
|---|---|---|---|
| JP | 664-87651 A | 3/1989 | |
| JP | H10204237 A | 8/1998 | |
| JP | 2002-12735 A | 1/2002 | |
| JP | 4060102 B2 | 3/2008 | |
| JP | 2012-251015 A | 12/2012 | |
| JP | 2018507923 A | 3/2018 | |
| JP | 2019059906 A | * 4/2019 | |
| JP | 2019127510 A | 8/2019 | |
| JP | 2019163452 A | * 9/2019 | ......... B29C 45/0001 |
| JP | 2022-516346 A | 2/2022 | |
| KR | 10-1999-0019314 A | 3/1999 | |
| KR | 10-2003-0052525 A | 6/2003 | |
| KR | 10-2006-0115271 A | 11/2006 | |
| KR | 10-0886348 B | 3/2009 | |
| KR | 10-2011-0042713 A | 4/2011 | |
| KR | 10-1339384 B | 12/2013 | |
| KR | 10-1478394 B | 12/2014 | |
| KR | 10-2017-0062984 A | 6/2017 | |
| KR | 10-2018-0073062 A | 7/2018 | |
| KR | 10-2019-0052798 A | 5/2019 | |
| KR | 10-2019-0110455 A | 9/2019 | |

OTHER PUBLICATIONS

Ishikawa JPS6487651 A (translation) (Year: 1989).*
Kosaku JP 2019/059906 A (JPO transl.) (Year: 2019).*
Extended European Search Report for related application EP 20879752.2, mailed Feb. 1, 2022.

* cited by examiner

*Primary Examiner* — Arrie L Reuther

(57) ABSTRACT

A thermoplastic resin composition of the present invention includes 65 to 85% by weight of a heat-resistant copolymer (A) containing 76 to 92% by weight of a (meth)acrylic acid alkyl ester compound, 1 to 8% by weight of an N-substituted maleimide compound, and 5 to 16% by weight of an aromatic vinyl compound; 10 to 30% by weight of an acrylate-based rubber-aromatic vinyl compound-vinyl cyanide compound graft copolymer (B) containing acrylate-based rubber having an average particle diameter of 50 to 200 nm; and 1 to 15% by weight of an acrylate-based rubber-aromatic vinyl compound-vinyl cyanide compound graft copolymer (C) containing acrylate-based rubber having an average particle diameter of 300 to 600 nm. In this case, in the heat-resistant copolymer (A), the weight ratio of the aromatic vinyl compound to the N-substituted maleimide compound is 1.5 to 8.

7 Claims, No Drawings

THERMOPLASTIC RESIN COMPOSITION, METHOD OF PREPARING THE SAME, AND MOLDED ARTICLE INCLUDING THE SAME

CROSS-REFERENCE TO RELATED APPLICATION

This application is a National Phase of International Application No. PCT/KR2020/012972 which claims priority to Korean Patent Application No. 10-2019-0132327, filed on Oct. 23, 2019 in the Korean Intellectual Property Office, the disclosures of which are incorporated herein by reference.

TECHNICAL FIELD

The present invention relates to a thermoplastic resin composition, a method of preparing the same, and a molded article including the same. More particularly, the present invention relates to a thermoplastic resin composition having excellent weather resistance, heat resistance, colorability, processability, and scratch resistance, a method of preparing the thermoplastic resin composition, and a molded article including the thermoplastic resin composition.

BACKGROUND ART

ABS resins, which are acrylonitrile-butadiene-styrene terpolymers, have excellent impact resistance, rigidity, chemical resistance, and processability. Thus, ABS resins have been used in various fields such as electrical and electronic products, building materials, and automobile parts. However, since ABS resins contain a butadiene rubber polymer, ABS resins have poor weather resistance. Accordingly, ABS resins are not suitable as outdoor materials.

To solve this problem and to obtain a thermoplastic resin having excellent physical properties, weather resistance, and aging resistance, an acrylonitrile-styrene-acrylate (ASA) resin prepared using a crosslinked alkyl acrylate rubber polymer without an ethylenically unsaturated polymer that causes aging when exposed to ultraviolet has been developed. These ASA resins have excellent weather resistance and aging resistance, and thus, have been used in various fields such as automobile parts, ship materials, leisure goods, construction materials, and horticultural goods.

In particular, in the case of ASA resins applied to automobiles, in addition to weather resistance, excellent colorability, heat resistance, and scratch resistance are required for an aesthetically pleasing appearance.

For this purpose, when an ASA resin, a vinyl cyanide compound, and an α-methylstyrene compound are kneaded, heat resistance is improved, but injection stability is reduced due to increased gas generation and gloss is reduced. In addition, since the color of a resin is deep yellow, colorability is reduced.

In addition, when compounding an ASA resin with a polymethyl methacrylate resin, colorability and scratch resistance are improved, but heat resistance is reduced. When toughened PMMA is used, processability is reduced.

Therefore, an ASA resin having excellent heat resistance, weather resistance, colorability, scratch resistance, and processability needs to be developed.

RELATED ART DOCUMENTS

[Patent Documents] KR 1478394 B1

DISCLOSURE

Technical Problem

Therefore, the present invention has been made in view of the above problems, and it is one object of the present invention to provide a thermoplastic resin composition having excellent weather resistance, heat resistance, colorability, processability, and scratch resistance.

It is another object of the present invention to provide a method of preparing the thermoplastic resin composition.

It is yet another object of the present invention to provide a molded article manufactured using the thermoplastic resin composition.

The above and other objects can be accomplished by the present disclosure described below.

Technical Solution

In accordance with one aspect of the present invention, provided is a thermoplastic resin composition including 65 to 85% by weight of a heat-resistant copolymer (A) containing 76 to 92% by weight of a (meth)acrylic acid alkyl ester compound, 1 to 8% by weight of an N-substituted maleimide compound, and 5 to 16% by weight of an aromatic vinyl compound; 10 to 30% by weight of an acrylate-based rubber-aromatic vinyl compound-vinyl cyanide compound graft copolymer (B) containing acrylate-based rubber having an average particle diameter of 50 to 200 nm; and 1 to 15% by weight of an acrylate-based rubber-aromatic vinyl compound-vinyl cyanide compound graft copolymer (C) containing acrylate-based rubber having an average particle diameter of 300 to 600 nm, wherein, in the heat-resistant copolymer (A), a weight ratio of the aromatic vinyl compound to the N-substituted maleimide compound is 1.5 to 8.

In accordance with another aspect of the present invention, provided is a method of preparing a thermoplastic resin composition, the method including kneading and extruding, under conditions of 200 to 270° C. and 200 to 300 rpm, 65 to 85% by weight of a heat-resistant copolymer (A) containing 76 to 92% by weight of a (meth)acrylic acid alkyl ester compound, 1 to 8% by weight of an N-substituted maleimide compound, and 5 to 16% by weight of an aromatic vinyl compound; 10 to 30% by weight of an acrylate-based rubber-aromatic vinyl compound-vinyl cyanide compound graft copolymer (B) containing acrylate-based rubber having an average particle diameter of 50 to 200 nm; and 1 to 15% by weight of an acrylate-based rubber-aromatic vinyl compound-vinyl cyanide compound graft copolymer (C) containing acrylate-based rubber having an average particle diameter of 300 to 600 nm, wherein, in the heat-resistant copolymer (A), a weight ratio of the aromatic vinyl compound to the N-substituted maleimide compound is 1.5 to 8.

In accordance with yet another aspect of the present invention, provided is a molded article manufactured using the thermoplastic resin composition.

Advantageous Effects

According to the present invention, a thermoplastic resin composition having excellent weather resistance, heat resistance, colorability, processability, and scratch resistance, a method of preparing the thermoplastic resin composition, and a molded article including the thermoplastic resin composition can be provided.

BEST MODE

Hereinafter, a thermoplastic resin composition, a method of preparing the same, and a molded article including the same according to the present invention will be described in detail.

The present inventors confirmed that, when two types of ASA resins each containing rubber particles having different particle diameters were mixed with a heat-resistant copolymer including a (meth)acrylic acid alkyl ester compound, an N-substituted maleimide compound, and an aromatic vinyl compound within a specific content range, heat resistance, weather resistance, colorability, processability, and scratch resistance were improved. Based on these results, the present inventors conducted further studies to complete the present invention.

The thermoplastic resin composition of the present invention includes 65 to 85% by weight of a heat-resistant copolymer (A) containing 76 to 92% by weight of a (meth)acrylic acid alkyl ester compound, 1 to 8% by weight of an N-substituted maleimide compound, and 5 to 16% by weight of an aromatic vinyl compound; 10 to 30% by weight of an acrylate-based rubber-aromatic vinyl compound-vinyl cyanide compound graft copolymer (B) containing acrylate-based rubber having an average particle diameter of 50 to 200 nm; and 1 to 15% by weight of an acrylate-based rubber-aromatic vinyl compound-vinyl cyanide compound graft copolymer (C) containing acrylate-based rubber having an average particle diameter of 300 to 600 nm. In this case, in the heat-resistant copolymer (A), the weight ratio of the aromatic vinyl compound to the N-substituted maleimide compound is 1.5 to 8. In this case, colorability, processability, and scratch resistance may be improved while maintaining weather resistance and heat resistance.

Hereinafter, each component of the thermoplastic resin composition of the present invention will be described in detail.

(A) Heat-Resistant Copolymer

For example, based on the total weight of the thermoplastic resin composition, the heat-resistant copolymer (A) may be included in an amount of 65 to 85% by weight, preferably 70 to 80% by weight, more preferably 72 to 77% by weight. Within this range, weather resistance, colorability, processability, and scratch resistance may be improved while maintaining heat resistance.

In the present invention, the heat-resistant copolymer refers to a copolymer having a glass transition temperature of 117° C. or more as measured using a differential scanning calorimeter (product name: DISCOVERY DSC25, manufacturer: TA Instruments Co.).

For example, the heat-resistant copolymer (A) may include 76 to 92% by weight of a (meth)acrylic acid alkyl ester compound, 1 to 8% by weight of an N-substituted maleimide compound, and 5 to 16% by weight of an aromatic vinyl compound. Within this range, heat resistance and weather resistance may be excellent, and in particular, colorability, processability, and scratch resistance may be improved.

For example, based on the total weight of the heat-resistant copolymer (A), the content of the (meth)acrylic acid alkyl ester compound included in the heat-resistant copolymer (A) may be 76 to 92% by weight, preferably 78 to % by weight, more preferably 84 to 90% by weight. Within this range, heat resistance and weather resistance may be excellent, and in particular, colorability, processability, and scratch resistance may be improved.

For example, based on the total weight of the heat-resistant copolymer (A), the content of the N-substituted maleimide compound included in the heat-resistant copolymer (A) may be 1 to 8% by weight, preferably 2 to 7% by weight, more preferably 3 to 7% by weight. Within this range, heat resistance and weather resistance may be excellent, and in particular, colorability, processability, and scratch resistance may be improved.

For example, based on the total weight of the heat-resistant copolymer (A), the content of the aromatic vinyl compound included in the heat-resistant copolymer (A) may be 5 to 16% by weight, preferably 7 to 15% by weight, more preferably 7 to 10% by weight. Within this range, heat resistance and weather resistance may be excellent, and in particular, colorability, processability, and scratch resistance may be improved.

For example, the weight ratio (SM/MI) of the aromatic vinyl compound (SM) to the N-substituted maleimide compound (MI) included in the heat-resistant copolymer (A) may be 1.5 to 8, preferably 1.6 to 7.5, more preferably 1.6 to 3.5, still more preferably 1.65 to 2.5. Within this range, heat resistance and weather resistance may be excellent, and in particular, colorability, processability, and scratch resistance may be improved.

For example, the (meth)acrylic acid alkyl ester compound included in the heat-resistant copolymer (A) may include one or more selected from the group consisting of (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester, preferably methyl methacrylate. In this case, proper fluidity may be ensured, and weather resistance and heat resistance may be excellent.

For example, the N-substituted maleimide compound included in the heat-resistant copolymer (A) may include one or more selected from the group consisting of N-phenyl maleimide, N-methyl maleimide, N-ethyl maleimide, N-butyl maleimide, and N-cyclohexyl maleimide, preferably N-phenyl maleimide. In this case, heat resistance and scratch resistance may be excellent.

For example, the aromatic vinyl compound included in the heat-resistant copolymer (A) may include one or more selected from the group consisting of styrene, α-methyl styrene, o-methyl styrene, p-methyl styrene, m-methyl styrene, ethyl styrene, isobutyl styrene, t-butyl styrene, o-bromo styrene, p-bromo styrene, m-bromo styrene, o-chloro styrene, p-chloro styrene, m-chloro styrene, vinyl toluene, vinyl xylene, fluorostyrene, and vinylnaphthalene, preferably styrene. In this case, processability may be excellent due to proper fluidity, and mechanical properties such as impact resistance may be excellent.

For example, the heat-resistant copolymer (A) may be a low-refractive-index heat-resistant copolymer having a refractive index of 1.515 or less, preferably 1.499 to 1.515, more preferably 1.499 to 1.512. Within this range, colorability may be excellent.

In the present invention, refractive index may be measured at 25° C. using an Abbe refractometer according to ASTM D542.

For example, the heat-resistant copolymer (A) may have a glass transition temperature of 117° C. or more, preferably 117 to 130° C., more preferably 117 to 125° C. Within this range, weather resistance, heat resistance, processability, scratch resistance, and colorability may be excellent.

In the present invention, glass transition temperature may be measured using a differential scanning calorimeter (product name: DISCOVERY DSC25, manufacturer: TA Instruments Co.).

For example, the heat-resistant copolymer (A) may have a weight average molecular weight of 80,000 to 130,000 g/mol, preferably 83,000 to 125,000 g/mol. Within this range, mechanical strength such as impact strength, scratch resistance, and colorability may be excellent.

In the present invention, weight average molecular weight is measured at 40° C. using tetrahydrofuran (THF) as an eluate using a gel chromatograph (GPC) filled with porous silica as a column packing material. In this case, weight average molecular weight is obtained as a relative value to a standard polystyrene (PS) specimen.

(B) Acrylate-Based Rubber-Aromatic Vinyl Compound-Vinyl Cyanide Compound Graft Copolymer Containing Acrylate-Based Rubber Having an Average Particle Diameter of 50 to 200 nm For example, based on the total weight of the thermoplastic resin composition, the acrylate-based rubber-aromatic vinyl compound-vinyl cyanide compound graft copolymer (B) containing acrylate-based rubber having an average particle diameter of 50 to 200 nm (hereinafter referred to as "small-diameter graft copolymer") may be included in an amount of 10 to 30% by weight, preferably 15 to 25% by weight, more preferably 20 to 25% by weight. Within this range, mechanical properties, such as impact strength and tensile strength, heat resistance, weather resistance, scratch resistance, and colorability may be excellent. When the content of the graft copolymer (B) is less than the above range, impact resistance may be reduced. When the content of the graft copolymer (B) exceeds the above range, fluidity and scratch resistance may be reduced.

For example, the small-diameter graft copolymer (B) may be an acrylate-based rubber-aromatic vinyl compound-vinyl cyanide compound graft copolymer containing acrylate-based rubber having an average particle diameter of 50 to 200 nm. In this case, mechanical properties, such as impact strength and tensile strength, heat resistance, colorability, and weather resistance may be excellent.

For example, the acrylate-based rubber contained in the small-diameter graft copolymer (B) may have an average particle diameter of 50 to 200 nm, preferably 70 to 150 nm, more preferably 100 to 130 nm. Within this range, mechanical properties, heat resistance, and weather resistance may be excellent. When the acrylate-based rubber has an average particle diameter less than the above range, mechanical properties such as impact strength and tensile strength may be degraded. When the acrylate-based rubber has an average particle diameter exceeding the above range, thermal stability may be degraded.

For example, based on the total weight of the small-diameter graft copolymer (B), the acrylate-based rubber contained in the small-diameter graft copolymer (B) may be included in an amount of 20 to 60% by weight, preferably 30 to 55% by weight, more preferably 40 to 50% by weight. Within this range, weather resistance, impact strength, and scratch resistance may be excellent.

In the present invention, average particle diameter may be measured using a Gaussian intensity distribution (Nicomp 380) through dynamic laser light scattering.

For example, the acrylate-based rubber may be prepared by emulsion polymerization of an acrylate-based monomer, as a specific example, by emulsion polymerization of a mixture containing an acrylate-based monomer, an emulsifier, an initiator, a grafting agent, a crosslinking agent, an electrolyte, and water. In this case, grafting efficiency may be excellent, and thus physical properties such as impact resistance may be excellent.

For example, the acrylate-based monomer may include one or more selected from the group consisting of alkyl acrylates having 2 to 8 carbon atoms, preferably alkyl acrylates including an alkyl group having 4 to 8 carbon atoms, more preferably butyl acrylate or ethylhexyl acrylate.

For example, the emulsifier may be a fatty acid metal salt having 12 to 20 carbon atoms, a rosin acid metal salt having 12 to 20 carbon atoms, or a mixture thereof. For example, the fatty acid metal salt having 12 to 20 carbon atoms may include one or more selected from sodium fatty acid, sodium laurate, sodium oleate, and potassium oleate. For example, the rosin acid metal salt having 12 to 20 carbon atoms may be sodium rosinate, potassium rosinate, or a mixture thereof. In this case, impact resistance and weather resistance may be improved.

For example, based on 100 parts by weight of the acrylate-based monomer, the emulsifier may be included in an amount of 1 to 4 parts by weight, preferably 1.5 to 3 parts by weight. Within this range, components of the acrylate-based rubber may be easily mixed, and thus impact resistance and weather resistance may be improved.

For example, the initiator may be an inorganic peroxide, an organic peroxide, or a mixture thereof. As a specific example, the initiator may include one or more selected from the group consisting of a water-soluble initiator such as potassium persulfate, sodium persulfate, or ammonium persulfate and a fat-soluble initiator such as cumene hydroperoxide or benzoylperoxide. In this case, polymerization may be facilitated, and thus impact resistance and weather resistance may be improved.

For example, based on 100 parts by weight of the acrylate-based monomer, the initiator may be included in an amount of 0.05 to 1 part by weight, preferably 0.1 to 0.5 parts by weight. Within this range, polymerization may be facilitated, and thus impact resistance and weather resistance may be improved.

For example, the crosslinking agent may include one or more selected from the group consisting of ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate, and trimethylol methane triacrylate. In this case, the elasticity of acrylate-based rubber may be further increased, and mechanical properties such as impact strength and tensile strength may be improved.

For example, based on 100 parts by weight of the acrylate-based monomer, the crosslinking agent may be included in an amount of 0.02 to 0.3 parts by weight, preferably 0.05 to 0.2 parts by weight. Within this range, the elasticity of acrylate-based rubber may be further increased, and mechanical properties such as impact strength and tensile strength may be improved.

For example, the electrolyte may include one or more selected from the group consisting of sodium hydrogen carbonate ($NaHCO_3$), sodium pyrosulfate ($Na_2S_2O_7$), and potassium carbonate ($K_2CO_3$).

For example, based on 100 parts by weight of the acrylate-based monomer, the electrolyte may be included in an amount of 0.01 to 0.5 parts by weight.

For example, the acrylate-based rubber may further include a molecular weight modifier. The molecular weight modifier may be, for example, t-dodecyl mercaptan, n-octyl mercaptan, or a mixture thereof. In this case, the weight average molecular weight of the acrylate-based rubber may be adjusted so that the impact resistance and weather resistance of a composition are improved.

For example, based on 100 parts by weight of the acrylate-based monomer, the molecular weight modifier may be included in an amount of 0.01 to 1 part by weight, preferably 0.01 to 0.3 parts by weight. Within this range, impact resistance and weather resistance may be improved.

For example, based on the total weight of the small-diameter graft copolymer (B), the aromatic vinyl compound included in the small-diameter graft copolymer (B) may be included in an amount of 10 to 50% by weight, preferably 20 to 45% by weight, more preferably 30 to 40% by weight. Within this range, mechanical properties, such as tensile strength and impact strength, and processability may be excellent.

For example, the aromatic vinyl compound included in the small-diameter graft copolymer (B) may include one or more selected from the group consisting of styrene, α-methyl styrene, o-methyl styrene, p-methyl styrene, m-methyl styrene, ethyl styrene, isobutyl styrene, t-butyl styrene, o-bromo styrene, p-bromo styrene, m-bromo styrene, o-chloro styrene, p-chloro styrene, m-chloro styrene, vinyl toluene, vinyl xylene, fluorostyrene, and vinylnaphthalene. In this case, processability may be excellent due to proper fluidity, and mechanical properties such as tensile strength and impact strength may also be excellent.

For example, based on the total weight of the small-diameter graft copolymer (B), the vinyl cyanide compound included in the small-diameter graft copolymer (B) may be included in an amount of 5 to 30% by weight, preferably 5 to 25% by weight, more preferably 10 to 20% by weight. Within this range, impact resistance and processability may be excellent.

For example, the vinyl cyanide compound included in the small-diameter graft copolymer (B) may be acrylonitrile, methacrylonitrile, or a mixture thereof. In this case, impact resistance and processability may be excellent.

(C) Acrylate-Based Rubber-Aromatic Vinyl Compound-Vinyl Cyanide Compound Graft Copolymer Containing Acrylate-Based Rubber Having an Average Particle Diameter of 300 to 600 nm For example, based on the total weight of the thermoplastic resin composition, the acrylate-based rubber-aromatic vinyl compound-vinyl cyanide compound graft copolymer (C) containing acrylate-based rubber having an average particle diameter of 300 to 600 nm (hereinafter referred to as "large-diameter graft copolymer") may be included in an amount of 1 to 15% by weight, preferably 1 to 10% by weight, more preferably 3 to 7% by weight. Within this range, mechanical properties, such as impact strength and tensile strength, heat resistance, weather resistance, scratch resistance, and colorability may be excellent. When the graft copolymer (C) is included in an amount less than the above range, impact resistance may be reduced. When the graft copolymer (C) is included in an amount exceeding the above range, grafting degree may be reduced, thereby reducing hardness and scratch resistance.

For example, the large-diameter graft copolymer (C) may be an acrylate-based rubber-aromatic vinyl compound-vinyl cyanide compound graft copolymer containing acrylate-based rubber having an average particle diameter of 300 to 600 nm. In this case, mechanical properties, such as impact strength and tensile strength, heat resistance, colorability, and weather resistance may be excellent.

For example, the large-diameter graft copolymer (C) may include 20 to 60% by weight of acrylate-based rubber having an average particle diameter of 300 to 600 nm, 10 to 50% by weight of an aromatic vinyl compound, and 5 to 30% by weight of a vinyl cyanide compound. Within this range, mechanical properties, heat resistance, and weather resistance may be improved.

For example, the acrylate-based rubber included in the large-diameter graft copolymer (C) may have an average particle diameter of 300 to 600 nm, preferably 300 to 500 nm, more preferably 350 to 450 nm. Within this range, mechanical properties such as impact strength and tensile strength may be excellent. When the average particle diameter of the acrylate-based rubber is less than the above range, impact resistance may be reduced. When the average particle diameter of the acrylate-based rubber exceeds the above range, fluidity, processability, and gloss may be reduced.

For example, based on the total weight of the large-diameter graft copolymer (C), the acrylate-based rubber included in the large-diameter graft copolymer (C) may be included in an amount of 20 to 60% by weight, preferably 30 to 55% by weight, more preferably 40 to 50% by weight. Within this range, impact resistance and scratch resistance may be improved.

For example, the acrylate-based rubber may be prepared by emulsion polymerization of an acrylate-based monomer, as a specific example, by emulsion polymerization of a mixture containing an acrylate-based monomer, an emulsifier, an initiator, a grafting agent, a crosslinking agent, an electrolyte, and water. In this case, grafting efficiency may be excellent, and thus physical properties such as impact resistance may be excellent.

Components such as an acrylate-based monomer, an emulsifier, an initiator, a grafting agent, a crosslinking agent, an electrolyte, and a solvent used to prepare the acrylate-based rubber included in the large-diameter graft copolymer (C) may be the same components as used to prepare the acrylate-based rubber included in the small-diameter graft copolymer (B). In addition, the content of each component of the acrylate-based rubber included in the large-diameter graft copolymer (C) may be selected within the same content range as the acrylate-based rubber included in the small-diameter graft copolymer (B).

For example, based on the total weight of the large-diameter graft copolymer (C), the aromatic vinyl compound included in the large-diameter graft copolymer (C) may be included in an amount of 10 to 50% by weight, preferably 20 to 45% by weight, more preferably 30 to 40% by weight. Within this range, impact resistance, weather resistance, and chemical resistance may be excellent.

For example, based on the total weight of the large-diameter graft copolymer (C), the vinyl cyanide compound included in the large-diameter graft copolymer (C) may be included in an amount of 5 to 30% by weight, preferably 5 to 25% by weight, more preferably 10 to 20% by weight. Within this range, mechanical strength and discoloration resistance may be excellent.

In the present invention, the total weight of a copolymer may mean the actual total weight of the copolymer or the total weight of monomers added instead of the copolymer.

The vinyl cyanide compound and the aromatic vinyl compound included in the large-diameter graft copolymer (C) may be the same as those included in the small-diameter graft copolymer (B).

Thermoplastic Resin Composition

For example, the thermoplastic resin composition may include one or more selected from the group consisting of a lubricant, an antioxidant, a UV stabilizer, a release agent, a pigment, and a dye. In this case, weather resistance, heat resistance, processability, and scratch resistance may be excellent without deterioration in mechanical properties.

For example, the lubricant may include one or more selected from the group consisting of ethylene bis stearamide, oxidized polyethylene wax, and magnesium stearate, preferably ethylene bis stearamide. In this case, the wettability of the composition of the present invention may be improved, and mechanical properties may be excellent.

For example, based on 100 parts by weight in total of the heat-resistant copolymer (A), the small-diameter graft copolymer (B), and the large-diameter graft copolymer (C), the lubricant may be included in an amount of 0.1 to 3 parts by weight, preferably 0.1 to 2 parts by weight, more preferably 0.05 to 1.5 parts by weight. Within this range, the wettability of the composition of the present invention may be improved, and mechanical properties may be excellent.

For example, the antioxidant may include phenolic antioxidants, phosphorus antioxidants, or mixtures thereof. In this case, oxidation by heat may be prevented during extrusion, and mechanical properties may be excellent.

For example, based on 100 parts by weight in total of the heat-resistant copolymer (A), the small-diameter graft copolymer (B), and the large-diameter graft copolymer (C), the antioxidant may be included in an amount of 0.01 to 3 parts by weight, preferably 0.01 to 1 part by weight, more preferably 0.1 to 1 part by weight. Within this range, oxidation by heat may be prevented during extrusion, and mechanical properties may be excellent.

For example, based on 100 parts by weight in total of the heat-resistant copolymer (A), the small-diameter graft copolymer (B), and the large-diameter graft copolymer (C), the dye may be included in an amount of 0.1 to 1.5 parts by weight, preferably 0.5 to 1 part by weight. Within this range, the intrinsic physical properties of the thermoplastic resin composition of the present invention may not be degraded, and color expression may be excellent.

For example, the thermoplastic resin composition may have a weather resistance (ΔE) of 1.75 or less, preferably 1.0 to 1.75, more preferably 1.5 to 1.7. Within this range, physical property balance may be excellent.

In the present invention, weather resistance (ΔE) may be measured using a weather resistance measuring device (QUV) under conditions of a UV lamp illuminance of 0.77 W/m$^2$, a humidity of 50%, a black panel temperature of 60° C., and stay for 20 hours. ΔE is the arithmetic mean value of Hunter Lab values before and after stay, and weather resistance increases as the value of ΔE approaches zero.

$$\Delta E = \sqrt{\{(L-L')^2 + (a-a')^2 + (b-b')^2\}} \quad (\sqrt{}: \text{radical sign})$$

For example, the thermoplastic resin composition may have an L value (colorability) of 24.7 or less, preferably 20 to 24.7, more preferably 23 to 24.6 as measured using a Hunter Lab spectrophotometer. Within this range, physical property balance may be excellent.

For example, the thermoplastic resin composition may have a fluidity of 11 to 15.5 g/10 min, preferably 12 to 15 g/10 min as measured at 220° C. under a load of 10 kg according to ASTM D1238. Within this range, processability may be excellent.

For example, the thermoplastic resin composition may have a pencil hardness of 2H or more, preferably 2H to 4H as measured at an angle of 45° under a load of 0.5 kg using a pencil hardness tester (Cometech) according to ASTM D3363. Within this range, physical property balance and scratch resistance may be excellent.

For example, the thermoplastic resin composition may have a heat deflection temperature of 89° C. or more, preferably 89 to 100° C., more preferably 89 to 93° C. as measured according to ASTM D648. Within this range, physical property balance may be excellent.

For example, the thermoplastic resin composition may have an Izod impact strength (¼", 23° C.) of 5 kgf·cm/cm or more, preferably 5 to 10 kgf·cm/cm, more preferably 5 to 8 kgf·cm/cm as measured according to ASTM D256. Within this range, physical property balance may be excellent.

Method of Preparing Thermoplastic Resin Composition

For example, the method of preparing a thermoplastic resin composition of the present invention includes a step of kneading and extruding, under conditions of 200 to 270° C. and 200 to 300 rpm, 65 to 85% by weight of a heat-resistant copolymer (A) containing 76 to 92% by weight of a (meth) acrylic acid alkyl ester compound, 1 to 8% by weight of an N-substituted maleimide compound, and 5 to 16% by weight of an aromatic vinyl compound; 10 to 30% by weight of an acrylate-based rubber-aromatic vinyl compound-vinyl cyanide compound graft copolymer (B) containing acrylate-based rubber having an average particle diameter of 50 to 200 nm; and 1 to 15% by weight of an acrylate-based rubber-aromatic vinyl compound-vinyl cyanide compound graft copolymer (C) containing acrylate-based rubber having an average particle diameter of 300 to 600 nm. In this case, in the heat-resistant copolymer (A), the weight ratio of the aromatic vinyl compound to the N-substituted maleimide compound is 1.5 to 8. In this case, weather resistance, heat resistance, colorability, processability, and scratch resistance may be excellent.

For example, the method of preparing a thermoplastic resin composition may include a step of preparing the heat-resistant copolymer (A) by polymerizing a polymerization solution prepared by mixing 100 parts by weight of a monomer mixture including 65 to 85% by weight of a heat-resistant copolymer including 76 to 92% by weight of a (meth)acrylic acid alkyl ester compound, 1 to 8% by weight of an N-substituted maleimide compound, and 5 to 16% by weight of an aromatic vinyl compound; 25 to 40 parts by weight of a reaction solvent; and 0.01 to 1 part by weight of an initiator.

For example, in the step of preparing the heat-resistant copolymer (A), the reaction solvent may include one or more selected from the group consisting of ethylbenzene, toluene, methyl ethyl ketone, and xylene. In this case, viscosity may be easily adjusted, and reduction in polymerization conversion rate may be prevented.

For example, based on 100 parts by weight of the monomer mixture, the reaction solvent may be included in an amount of 25 to 40 parts by weight, preferably 30 to 40 parts by weight. Within this range, excessive increase in viscosity and reduction in conversion rate and molecular weight may be prevented.

For example, in the step of preparing the heat-resistant copolymer (A), the initiator may include one or more selected from the group consisting of t-butyl peroxy-2-ethylhexanoate, benzoyl peroxide, t-butyl peroxyisobutyrate, 1,1-bis(t-butylperoxy)cyclohexane, 2,2-bis(4,4-di-t-butylperoxycyclohexane)propane, t-hexyl peroxy isopropyl monocarbonate, t-butyl peroxylaurate, t-butyl peroxy isopropyl monocarbonate, t-butyl peroxy 2-ethylhexyl monocarbonate, t-hexyl peroxybenzoate, t-butyl peroxyacetate, 2,2-bis(t-butylperoxy)butane, t-butyl peroxybenzoate, dicumyl peroxide, 2,5-dimethyl-2,5-bis(t-butyl peroxy) hexane, t-butyl cumyl peroxide, di-t-butyl peroxide, and di-t-amyl peroxide, preferably t-butyl peroxy-2-ethylhexanoate. In this case, polymerization may be easily performed, and thus mechanical properties, weather resistance, heat resistance, and scratch resistance may be improved.

For example, based on 100 parts by weight of the monomer mixture, the initiator may be included in an amount of 0.01 to 1 part by weight, preferably 0.01 to 0.5 parts by weight, more preferably 0.01 to 0.2 parts by weight. Within this range, polymerization may be easily performed, and thus mechanical properties, weather resistance, heat resistance, and scratch resistance may be improved.

For example, in the step of preparing the heat-resistant copolymer (A), polymerization may be performed at a temperature of 130 to 160° C., preferably 140 to 150° C., while continuously feeding the polymerization solution at a rate of 7 to 20 kg/hr, preferably 10 to 15 kg/hr, into a continuous reactor. In this case, compared to batch feed, the particle stability of a copolymer may be improved, and thus the particles may have a uniform internal structure, thereby improving mechanical properties, weather resistance, heat resistance, scratch resistance, and colorability.

In the present invention, "continuous polymerization" refers to a process in which materials participating in polymerization are continuously fed into a reactor, a product generated by polymerization is continuously discharged, and unreacted monomers are recovered by volatilization and used again.

For example, kneading and extruding may be performed using a single-screw extruder, a twin-screw extruder, or a Banbury mixer. In this case, a composition may be evenly dispersed, thereby increasing compatibility.

For example, kneading and extruding may be performed at a barrel temperature of 200 to 300° C., preferably 200 to 250° C. In this case, throughput per unit time may be appropriate, melt kneading may be sufficiently performed, and thermal decomposition of resin components may be prevented.

For example, kneading and extruding may be performed at a screw speed of 200 to 300 rpm, preferably 250 to 300 rpm. In this case, throughput per unit time may be appropriate, and thus process efficiency may be excellent and excessive cutting may be prevented.

For example, the molded article of the present invention may be manufactured using the thermoplastic resin composition of the present invention. In this case, weather resistance, colorability, processability, and scratch resistance may be improved while maintaining heat resistance.

For example, the molded article may include one or more selected from the group consisting of automobile parts, electric/electronic parts, and construction materials, preferably interior/exterior materials for automobiles.

In describing the thermoplastic resin composition of the present invention, the method of preparing the same, and the molded article including the same, it should be noted that other conditions or equipment not explicitly described herein may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples and Comparative Examples below are as follows.

Small-diameter graft copolymer (B): A graft copolymer (SA130, LG Chemical Co.) containing rubber particles having average particle diameter of 120 nm was used as the small-diameter graft copolymer (B)

Large-diameter graft copolymer (C): A graft copolymer (SA927, LG Chemical Co.) containing rubber particles having an average particle diameter of 400 nm was used as the large-diameter graft copolymer (C)

Lubricant: ethylene bis stearamide (EBA)

Antioxidant: Songnox 11B (Songwon Co.)

Dye: BK-39 (LG Chemical Co.)

Example 1

<Preparation of Heat-Resistant Copolymer (A)>

Polymerization was performed at 145° C. while continuously feeding, at a rate of 12 kg/hr for 24 hours, a polymerization solution containing 33.3 parts by weight of toluene, 90% by weight of methyl methacrylate (hereinafter referred to as "MMA"), 3% by weight of N-phenylmaleimide (hereinafter referred to as "PMI"), 7% by weight of styrene (hereinafter referred to as "SM"), and 0.04 parts by weight of dicumyl peroxide as an initiator into a continuous reactor, and then the reaction product was introduced into a volatilization tank at 250° C. to remove unreacted monomers and a reaction solvent. After reaction, the heat-resistant copolymer (A) in a pellet form was prepared. The prepared copolymer had a refractive index of 1.4996, a glass transition temperature of 120.5° C., and a weight average molecular weight of 84,000 g/mol.

<Preparation of Thermoplastic Resin Composition>

1 part by weight of a lubricant, 0.5 parts by weight of an antioxidant, and 0.5 parts by weight of a dye were added to a composition including 75 parts by weight of the heat-resistant copolymer (A), 20 parts by weight of the small-diameter graft copolymer (B), and 5 parts by weight of the large-diameter graft copolymer (C), and the mixture was fed into an extruder (28 ψ) at 230° C. to prepare a pelletized resin. Then, the pelletized resin was injected to prepare a specimen.

Examples 2 to 7

The heat-resistant copolymer (A) was prepared in the same manner as in Example 1, except that the components and the contents shown in Table 1 below were used.

Comparative Examples 1 to 7

The heat-resistant copolymer (A) was prepared in the same manner as in Example 1, except that the components and the contents shown in Table 2 below were used.

Test Examples

The properties of specimens prepared in Examples 1 to 7 and Comparative Examples 1 to 7 were measured according the following methods, and the results are shown in Tables 1 and 2 below.

Measurement Methods

Refractive index: Refractive index was measured at 25° C. using an Abbe refractometer according to ASTM D542.

Weight average molecular weight (g/mol): Weight average molecular weight was measured at 40° C. using tetrahydrofuran (THF) as an eluate using a gel chromatograph (GPC) filled with porous silica as a column packing material. In this case, weight average molecular weight was obtained as a relative value to a standard polystyrene (PS) specimen.

Glass transition temperature (° C.): Glass transition temperature was measured using a differential scanning calorimeter (product name: DISCOVERY DSC25, manufacturer: TA Instruments Co.).

Izod impact strength (kgf·cm/cm): Izod impact strength was measured using a ¼" thick specimen according to ASTM D256.

Fluidity (g/10 min): Fluidity was measured at 220° C. under a load of 10 kg for 10 minutes according to ASTM D1238.

Heat deflection temperature (° C.): Heat deflection temperature was measured using a 6.4 mm thick specimen under a load of 18.6 kgf/cm² according to ASTM D648.

Pencil hardness: Pencil hardness was measured using a pencil hardness tester (Cometech) according to ASTM D3363. Specifically, a pencil was fixed at an angle of 45°, and the surface of a specimen was scratched with the pencil under a load of 0.5 kg. At this time, pencils of various hardnesses (2B, B, HB, F, H) were used. The tests were conducted in the order of 2B, B, HB, F, and H. After scratching, whether the surface was scratched was confirmed by visual observation.

Colorability (blackness; color L): A color L value was measured using a color meter (model name: Color Eye 7000A) according to a CIE 1976 L*a*b* color system. In this case, L=100 means pure white, and L=0 means pure black. Blackness becomes better as the L value decreases.

Weather resistance (ΔE): Weather resistance (ΔE) was measured using a weather resistance measuring device (QUV) under conditions of a UV lamp illuminance of 0.77 W/m², a humidity of 50%, a black panel temperature of 60° C., and stay for 20 hours. ΔE is the arithmetic mean value of Hunter Lab values before and after stay, and weather resistance increases as the value of ΔE approaches zero.

$$\Delta E = \sqrt{\{(L-L')^2 + (a-a')^2 + (b-b')^2\}}\ (\sqrt{}:\text{radical sign})$$

TABLE 1

| Classification | | Example 1 | Example 2 | Example 3 | Example 4 | Example 5 | Example 6 | Example 7 |
|---|---|---|---|---|---|---|---|---|
| Composition of heat-resistant copolymer (A) | MMA | 90 | 86 | 81 | 78 | 84 | 83 | 80 |
| | PMI | 3 | 4 | 4 | 7 | 6 | 2 | 5 |
| | SM | 7 | 10 | 15 | 15 | 10 | 15 | 15 |
| Physical properties of heat-resistant copolymer (A) | Refractive index | 1.4996 | 1.5038 | 1.5088 | 1.5125 | 1.5118 | 1.5117 | 1.5150 |
| | Mw | 84,000 | 113,000 | 122,000 | 103,000 | 98,000 | 96,000 | 85,000 |
| | Tg | 120.5 | 120.8 | 117.9 | 121.7 | 123.1 | 117.4 | 120.3 |
| Composition of thermoplastic resin composition | (A) | 75 | 75 | 75 | 75 | 75 | 75 | 75 |
| | (B) | 20 | 20 | 20 | 20 | 20 | 20 | 20 |
| | (C) | 5 | 5 | 5 | 5 | 5 | 5 | 5 |
| Physical properties of thermoplastic resin composition | Impact strength | 5 | 6 | 7 | 6 | 6 | 6 | 5 |
| | Fluidity | 15 | 13 | 12 | 14 | 14 | 14 | 15 |
| | Heat deflection temperature | 91 | 91 | 89 | 92 | 93 | 89 | 91 |
| | Pencil hardness | 2H | 2H | 2H | 2H | 2H | 2H | 2H |
| | Colorability | 23.8 | 24.1 | 24.3 | 24.5 | 24.4 | 24.4 | 24.6 |
| | Weather resistance | 1.5 | 1.6 | 1.6 | 1.7 | 1.6 | 1.6 | 1.6 |

TABLE 2

| Classification | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Composition of heat-resistant copolymer (A) | MMA | 95 | 79 | 76 | 60 | 84 | 92 | 70 |
| | PMI | 5 | 3 | 4 | 10 | 10 | 4 | 3 |
| | SM | 0 | 18 | 20 | 30 | 6 | 4 | 27 |
| Physical properties of heat-resistant copolymer (A) | Refractive index | 1.4981 | 1.5168 | 1.5178 | 1.5311 | — | — | 1.5246 |
| | Mw | 70,000 | 96,000 | 140,000 | 142,000 | — | — | 149,000 |
| | Tg | 121.8 | 117.7 | 114.5 | 114.2 | — | — | 110.7 |
| Composition of thermoplastic resin composition | (A) | 75 | 75 | 75 | 75 | — | — | 75 |
| | (B) | 20 | 20 | 20 | 20 | — | — | 20 |
| | (C) | 5 | 5 | 5 | 5 | — | — | 5 |
| Physical properties of thermoplastic resin composition | Impact strength | 3 | 6 | 9 | 10 | — | — | 10 |
| | Fluidity | 16 | 14 | 10 | 10 | — | — | 9 |
| | Heat deflection temperature | 92 | 89 | 86 | 86 | — | — | 82 |
| | Pencil hardness | H | H | H | F | — | — | F |
| | Colorability | 23.8 | 24.7 | 25.0 | 25.5 | — | — | 25.3 |
| | Weather resistance | 1.5 | 1.7 | 1.8 | 1.9 | | | 1.9 |

As shown in Tables 1 and 2, it can be confirmed that compared to Comparative Examples 1 to 7 outside the range of the present invention, Examples 1 to 7 according to the present invention exhibit excellent impact strength, heat resistance, weather resistance, fluidity, heat deflection temperature, pencil hardness (scratch resistance), and colorability.

In addition, the heat-resistant copolymers (A) of Examples 1 to 7 according to the present invention exhibit low refractive indexes and increased glass transition temperatures, indicating that the colorability and heat deflection temperature of a resin composition are improved.

In addition, in the case of Comparative Examples 5 and 6 in which the weight ratio of SM/PMI in the heat-resistant copolymer (A) is less than 1.5, PMI is precipitated during a volatilization process, and thus polymerization cannot be performed. In the case of Comparative Example 7 in which the weight ratio of SM/PMI exceeds 8, the heat-resistant copolymer (A) exhibits low glass transition temperature and high refractive index, indicating that the heat deflection temperature, pencil hardness (scratch resistance), colorability, and weather resistance of a resin composition are poor.

The invention claimed is:

1. A thermoplastic resin composition, comprising:
65 to 85% by weight of a heat-resistant copolymer (A) containing 86 to 90% by weight of a (meth)acrylic acid alkyl ester compound, 3 to 4% by weight of an N-substituted maleimide compound, and 7 to 10% by weight of an aromatic vinyl compound;
10 to 30% by weight of an acrylate-based rubber-aromatic vinyl compound-vinyl cyanide compound graft copolymer (B) containing acrylate-based rubber having an average particle diameter of 50 to 200 nm; and
1 to 15% by weight of an acrylate-based rubber-aromatic vinyl compound-vinyl cyanide compound graft copolymer (C) containing acrylate-based rubber having an average particle diameter of 300 to 600 nm,
wherein, in the heat-resistant copolymer (A), a weight ratio of the aromatic vinyl compound to the N-substituted maleimide compound is 1.6 to 7.5,
wherein the heat-resistant copolymer (A) has a refractive index of 1.515 or less,
wherein the heat-resistant copolymer (A) has a weight average molecular weight of 80,000 to 130,000 g/mol,
wherein the thermoplastic resin composition has an L value (colorability) of 20 to 24.1 as measured using a color meter according to a CIE 1976 L*a*b* color system, and
wherein the thermoplastic resin composition has a heat deflection temperature of 91° C. or more.

2. The thermoplastic resin composition according to claim 1, wherein the heat-resistant copolymer (A) has a glass transition temperature of 117° C. or more.

3. The thermoplastic resin composition according to claim 1, wherein the graft copolymer (B) comprises 20 to 60% by weight of the acrylate-based rubber having an average particle diameter of 50 to 200 nm, 10 to 50% by weight of an aromatic vinyl compound, and 5 to 30% by weight of a vinyl cyanide compound.

4. The thermoplastic resin composition according to claim 1, wherein the graft copolymer (C) comprises 20 to 60% by weight of the acrylate-based rubber having an average particle diameter of 300 to 600 nm, 10 to 50% by weight of an aromatic vinyl compound, and 5 to 30% by weight of a vinyl cyanide compound.

5. The thermoplastic resin composition according to claim 1, wherein the thermoplastic resin composition has a weather resistance (ΔE) of 1.75 or less.

6. The thermoplastic resin composition according to claim 1, wherein the thermoplastic resin composition has an L value (colorability) of 23 to 24.1 as measured using a Hunter Lab spectrophotometer.

7. The thermoplastic resin composition according to claim 1, wherein the thermoplastic resin composition has a fluidity of 11 to 15.5 g/10 min as measured at 220° C. under a load of 10 kg according to ASTM D1238.

* * * * *